(12) United States Patent
Tabaaloute

(10) Patent No.: US 8,065,389 B2
(45) Date of Patent: Nov. 22, 2011

(54) METHOD OF AND DEVICE FOR TRANSFERRING CONTENT

(75) Inventor: Zahra Tabaaloute, Southampton (GB)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 12/676,307

(22) PCT Filed: Aug. 26, 2008

(86) PCT No.: PCT/IB2008/053427
§ 371 (c)(1),
(2), (4) Date: Mar. 3, 2010

(87) PCT Pub. No.: WO2009/031071
PCT Pub. Date: Mar. 12, 2009

(65) Prior Publication Data
US 2010/0174801 A1 Jul. 8, 2010

(30) Foreign Application Priority Data
Sep. 3, 2007 (EP) .................................. 07115535

(51) Int. Cl.
*G06F 15/16* (2006.01)
(52) U.S. Cl. .................... 709/217; 709/218; 709/224
(58) Field of Classification Search .................. 709/203, 709/224–225, 227, 217–218
See application file for complete search history.

(56) References Cited

U.S. PATENT DOCUMENTS

| 7,764,956 B2* | 7/2010 | Herberger et al. | 455/418 |
| 2003/0146977 A1* | 8/2003 | Vale et al. | 348/207.1 |
| 2004/0159255 A1* | 8/2004 | Ohmura | 101/484 |
| 2006/0189348 A1* | 8/2006 | Montulli et al. | 455/556.1 |
| 2006/0199612 A1* | 9/2006 | Beyer et al. | 455/556.2 |
| 2006/0223556 A1* | 10/2006 | Xu et al. | 455/502 |
| 2009/0098854 A1* | 4/2009 | Park et al. | 455/407 |

FOREIGN PATENT DOCUMENTS

| WO | 2006/084622 A1 | 8/2006 |
| WO | 2007/069004 A1 | 6/2007 |

* cited by examiner

*Primary Examiner* — Faruk Hamza

(57) ABSTRACT

A method of transferring content (CONT1, CONT2) between at least two devices (DEV1, DEV2, DEV3), the devices (DEV1, DEV2, DEV3) being capable of outputting said content (CONT1, CONT2), and a device (DEV1) itself is disclosed. First, said devices (DEV1, DEV2, DEV3) are connected via associated interfaces (INT1, INT2, INT3). Then, there is a detection or negotiation which of the devices (DEV1, DEV2, DEV3) is currently outputting content (CONT1, CONT2). Finally, content (CONT1, CONT2), which is currently being output, is transferred from the corresponding outputting device or devices (DEV1, DEV2) to the other device or devices (DEV1, DEV2, DEV3) via said interfaces (INT1, INT2, INT3).

5 Claims, 2 Drawing Sheets

METHOD OF AND DEVICE FOR TRANSFERRING CONTENT

FIELD OF THE INVENTION

The invention relates to a method of transferring content between at least two devices, which are capable of outputting said content and which are connected via associated interfaces. Furthermore the invention relates to a device, comprising means for outputting content and an interface for connecting to at least another device.

BACKGROUND OF THE INVENTION

Hand in hand with the increasing number of consumer electronics devices (e.g. MP3 players, mobile phones, and PCs) the user's wish to share content (e.g. pictures, music, and videos) with others, which content is stored on these devices, has been increasing. Accordingly, the frequency of content or data transfers has increased as well why consumers demand simple solutions to perform this action.

OBJECT AND SUMMARY OF THE INVENTION

It is an object of the invention to lower the numbers of user interactions, for instance key strokes and mouse clicks, to share or transfer content.

The object of the invention is achieved by a method as disclosed in the introduction, additionally comprising the steps of:

detecting which of the devices is currently outputting content and transferring content, which is currently being output, from the corresponding outputting device or devices to the other device or devices via said interfaces.

The object of the invention is furthermore achieved by a device as disclosed in the introduction and additionally comprising:

means for detecting if said device is currently outputting said content and means for sending said content, which is currently being output, to said at least another device via said interface.

According to an exemplary embodiment, content transfer may be performed in a very simple and intuitive way. Instead of a cumbersome procedure to transfer content, e.g. nested menus and a high number of clicks, the inventive device "intuitively" knows what to do. If, for example, a first device currently is outputting content and is connected to a second device, the first device "assumes" that its user wants to transfer the content—which currently is being output on the first device—from this first device to the second device. Hence, almost no user action is needed for this content transfer.

The term "outputting content" in this context may be understood as any form of reproduction or rendering of audio and/or video information.

In a preferred embodiment, the content transfer is started upon user confirmation. To avoid unwanted content transfer to devices, to which a connection was made by chance, the transfer is started upon user confirmation, e.g. by answering the simple question "Do you want to transfer picture 123 to device xyz?"

In further preferred embodiment, the content transfer is only started if there is just one outputting device. This may regulate what to do if more than one device is currently outputting content. Otherwise, if a high number of devices try to transfer content, a time consuming procedure can result.

In yet another preferred embodiment, each outputting device transfers the content, which it is currently outputting, to said other device or devices. Basically, this is the other way around to avoid said confusion. In this case, each outputting device transfers its content. This could be time consuming but, however, requires very little user action if content between a lot of devices shall be exchanged.

In a further preferred embodiment, said content is one of a picture, an audio clip or a music track, a video clip or a movie, a text, or a combination of any of these. This is only an extract of the most common types of content that may be shared or transferred—there are manifold other types of content known to the skilled person. It should be noted that said content may also be the combination of different types of content being output at the same time e.g. a picture, an associated text, and an audio message. Another example is a picture being displayed and a music track being played at the same time.

In a further preferred embodiment, said device is one of a digital picture frame, a MP3 player, a stereo or Dolby surround device, a TV set, a DVD recorder, a satellite receiver, a digital book, a PC, a mobile phone, or a PDA. This is a extract of the most common types of devices, which are used to store, output, and transfer content.

Finally, it is advantageous, if said contactless interface is an interface working according a standard for Near Field Communication. like for example ISO/IEC 18092/ECMA-340. Near Field Communication (NFC) is a short-range wireless technology with speeds up to 424 kbit/s. The communication mode can be peer-to-peer read/write or tag reader/writer mode. When an NFC enabled device touches another peer or a tag, a data transfer occurs. NFC data transfer and data transmission may be secured. Mobile technology manufacturers support this technology as it provides an intuitive and simple solution for many applications. These applications range from URL transfer, digital rights transfer, access control and ticketing, payment etc. However, the invention is not limited to NFC, but the content or data transfer may also be done by means of other standards such as WLAN, Bluetooth or GPRS, USB network, wired Ethernet, etc., or by the combination of any of these.

In a preferred embodiment, a device acting as NFC initiator detects whether it is currently outputting content and if yes, sends this content to the other device or devices acting as NFC target or targets and if no, receives content currently being output by said other device or devices. This embodiment is of particular advantage if a device (as target) is always outputting content, e.g. digital picture frame in a slideshow and, for example, a mobile phone (as initiator) connects to the digital picture frame during the slideshow. In this scenario, a user who has a picture opened on his mobile phone most likely wants to transfer this picture to the digital picture frame. As the initiator decides the transfer direction, an unwanted content transfer from the digital picture frame to the mobile phone is suppressed or avoided. So, the mobile phone is able to send a picture to the digital picture frame without receiving pictures being shown during the slideshow. However, if no picture is opened on the phone, the picture being currently output by the digital picture frame is automatically sent to the mobile phone. One can easily imagine that this example also relates to other types of content, for example to a TV set (as target) showing videos, a PC (as target) showing texts, or an audio system (as target) outputting music tracks.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
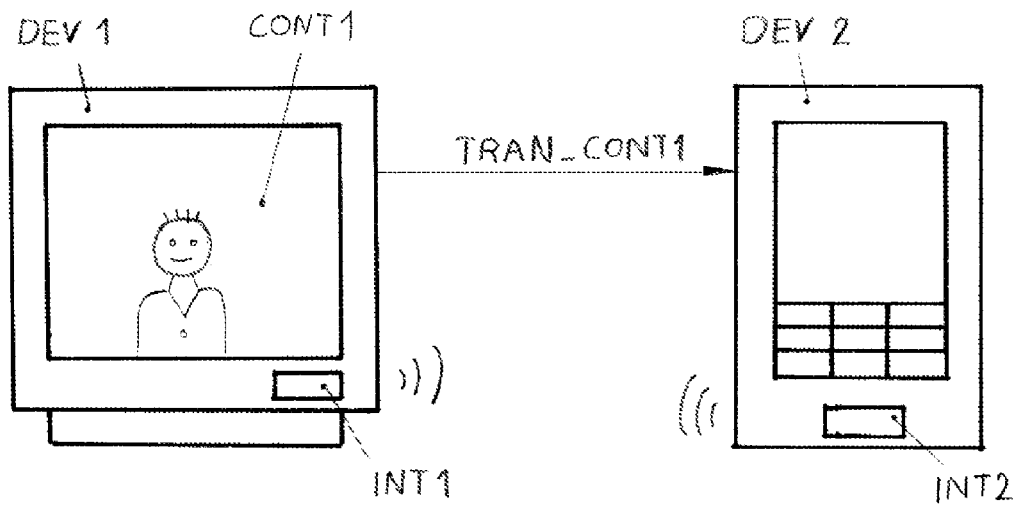
FIG. 1 shows a content transfer between a digital picture frame and a mobile phone.

FIG. 1 shows a content transfer between a digital picture frame and a mobile phone. The digital picture frame is one example for a first device DEV1 and the mobile phone is one example for a second device DEV2.

The first device DEV1 comprises a first contactless interface INT1 and is currently outputting first content CONT1, which in this example is a portrait. Similarly, the second device comprises a second contactless interface INT2. Both devices DEV1 and DEV2 are connected via their interfaces INT1 and INT2, which is a radio link in this case. After this connection, device detection or even a negotiation between said devices DEV1 and DEV2 is started. The aim is to find out which of the devices DEV1 and DEV2 is currently outputting or rendering content, that is to say an outputting status-information is detected. In this embodiment the result of the detection or negotiation is that the first device DEV1 is outputting first content CONT1 and the second device is not outputting content at all. Accordingly, based on the outputting status-information, the first content TRAN_CONT1 is transferred to the second device DEV2 via the radio link between the interfaces INT1 and INT2 and is stored in the second device DEV2. One can see that no cumbersome user action is required for this data transfer.

It should be mentioned that the interfaces may be adapted as wired interfaces.

Figure 2:
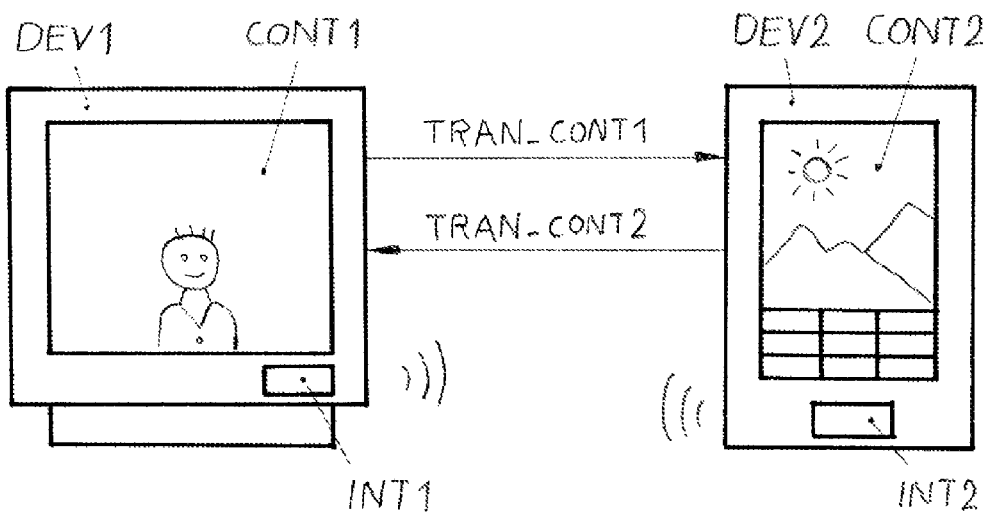
FIG. 2 shows another content transfer between a digital picture frame and a mobile phone.

FIG. 2 shows another content transfer between a digital picture frame DEV1 and a mobile phone DEV2 that, except the differences stated hereinafter, is identical compared to the transfer described in FIG. 1. In this embodiment also the second device DEV2 is outputting second content CONT2, in this case a landscape. Accordingly, the result of the detection or negotiation is that also the second device DEV2 is outputting or rendering the second content CONT2. Hence, in addition to the transfer of the first content TRAN_CONT1, also the second content is transferred TRAN_CONT2 from the second device DEV2 to the first device DEV1. In this way, two users may easily exchange content, e.g. pictures shown on the display of their respective devices or music tracks output through loudspeakers of the devices.

Figure 3:
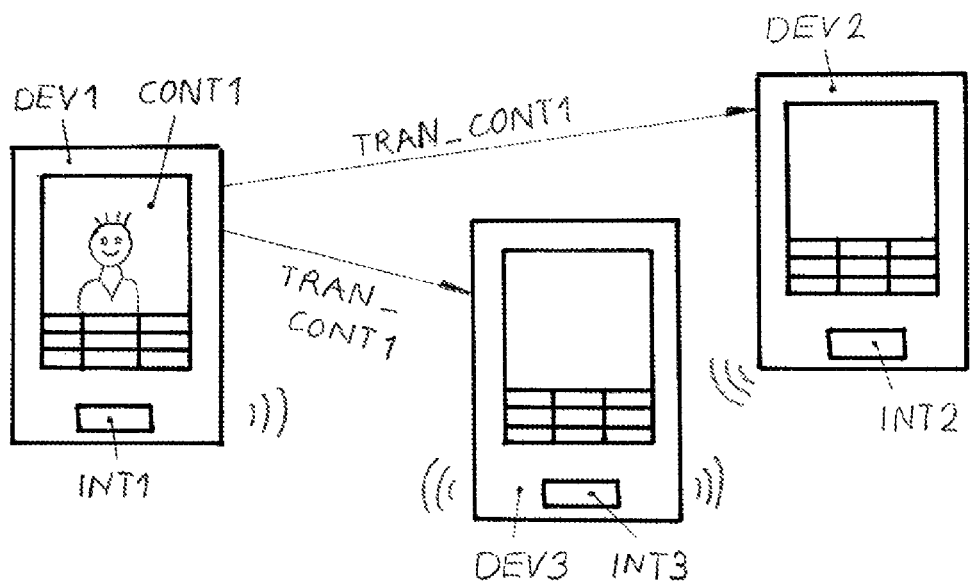
FIG. 3 shows an arrangement of three mobile phones.

FIG. 3 shows an arrangement of three devices DEV1, DEV2, and DEV3, which are all mobile phones in this example. After connecting the devices DEV1, DEV2, and DEV3 through their interfaces INT1, INT2, and INT3 the detection or negotiation procedure is started. The result in this example may be that only the first device DEV1 is outputting the first content CONT1, again a portrait. Accordingly, the first content is transferred TRAN_CONT1 to the second device DEV2 and the third device DEV3 via the data link. However, in this situation also a question to the user may be done, i.e. requesting input from the user to which of the second device DEV2 or the third device DEV3 the first content CONT1 should be send.

Figure 4:
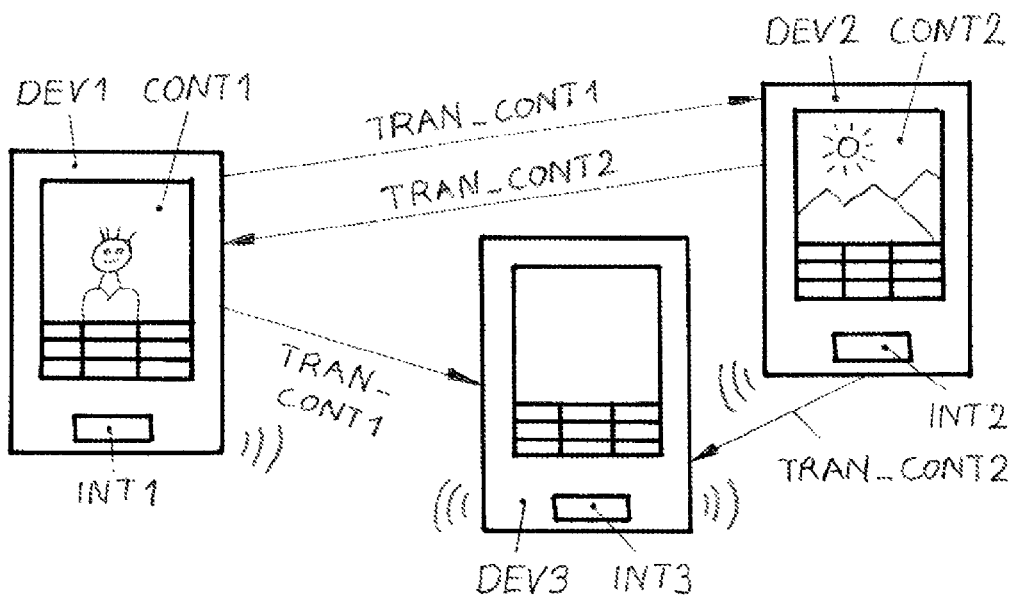
FIG. 4 shows another arrangement of three mobile phones.

FIG. 4 shows another arrangement between three mobile phones DEV1, DEV2, and DEV3 that, except the differences stated hereinafter, is identical to the arrangement of FIG. 3. In this embodiment also the second device DEV2 is outputting second content CONT2, which is a landscape. Accordingly, the result of the detection or negotiation is that also the second device DEV2 is outputting the second content CONT2. Hence, in addition to the transfer of the first content TRAN_CONT1, also the second content is transferred TRAN_CONT2 from the second device DEV2 to the first device DEV1 and the third device DEV3. In this way, a group of users may easily exchange or share content, e.g. pictures shown on the display of their devices or music tracks output through loudspeakers of the devices. However, in this situation again a question to the users is imaginable, to which of the devices DEV1, DEV2, and DEV3 content CONT1, CONT2 shall be sent.

In another exemplary embodiment the devices DEV1, DEV2, and DEV3 may be connected through interfaces INT1, INT2, and INT3 that work according the standard for Near Field Communication, NFC for short, there is another differentiation between the devices DEV1, DEV2, and DEV3. When a NFC link is built up, one device is the initiator and the other is the target (e.g. the first device DEV1 is the initiator and the second device DEV2 and the third device DEV3 are targets in FIG. 4). In this case the initiator device decides in which direction data shall be transferred depending on its state. If the content to transfer is opened using an application on the initiator, the transfer direction is from initiator to target. Otherwise, the direction is from the target device to the initiator. It should be noted that the NFC link may be used for content transfer, but also just as a bootstrap for another faster data link, such as such as WLAN, Bluetooth or GPRS, USB network, wired Ethernet, for transferring the content.

In a first implementation, the initiator device retrieves the following information from the target device via NFC for example:

Target device unique identification address (IP address, web URL, Bluetooth ID etc. . . . ).

Path to the content active (if any) at the time the NFC detection occurred.

Location on the target device where received content can be dumped. This is not necessary if the devices agree on a fixed location or it can be derived from the target device address (partially fixed).

The initiator device checks if any content is opened (ready for transfer) and decides whether to send (case where content is active on the initiator) or get the content. In this implementation, the target only provides the initiator with the set of information described above. It is the responsibility of the initiator to either send the content to the target or retrieve the content from the target.

In a second implementation, the initiator checks if any content is opened (ready for transfer) and decides whether to send (case where content is active on the initiator) or get the content, if it connects to the target.

If content shall be transferred from initiator to target, the initiator device gets the following information from the target before content actually is sent:

Target device unique identification address (IP address, web URL, Bluetooth ID etc. . . . ).

Location on the target device where content can be dumped. This is not necessary if the devices agree on a fixed location or it can be derived from the target device address (partially fixed).

If content shall be transferred from target to initiator, the initiator device sends the following information to the target before content actually is sent:

Initiator device unique identification address (IP address, web URL, Bluetooth ID etc. . . . ).

Location on the initiator device where content can be dumped. This might not be necessary if the devices agree on a fixed location or it can be derived from the initiator device address (partially fixed).

It should be noted, that "currently outputting content" does not necessarily mean that content has to be output at the time of connecting the devices, i.e. that the output has to start before the connection. It also means that content output may start during a connection. In this case opening a picture, starting a music track or video track, etc. by the user has also the (implicit) consequence of transferring this content to connected devices. However, there is no need to explicitly start a dedicated transfer function each time a new picture or music track is opened.

Furthermore, it should be noted that although the Figures just show pictures as an example for content, of course the Figures relate also to other types of content such as music tracks, a video clips or a movies, and texts. Moreover, content can also be the combination of different types of content being output at the same time e.g. a picture, an associated text, and an audio message. Another example is a picture being displayed and a music track being played at the same time.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprise" and its conjugations do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. Method of transferring content between at least two devices, comprising:
    connecting said devices via associated interfaces, the interfaces adapted according to the standard for Near Field Communication (NFC), the devices being capable of outputting said content; and
    detecting an outputting status-information of at least one of the devices; and
    transferring content between the devices via said interfaces based on the outputting status-information wherein a device acting as an NFC initiator detects whether it is currently outputting content and if yes, sends this content to the other device or devices acting as NFC target or targets and if no, receives content currently being output by the other device or devices.

2. Method of claim 1, wherein the content transfer is started upon user confirmation.

3. Method of claim 1, wherein the content transfer is only started if there is just one outputting device.

4. Method of claim 1, wherein each outputting device transfers the content, to said other device or devices.

5. Device, comprising:
    means for outputting content; and
    an interface for connecting to at least another device wherein the interface is adapted according to the standard for Near Field Communication (NFC); and
    means for detecting an outputting status-information of one of said devices;
    transmission means for transmitting content between the devices via said interface based on the outputting status-information and configuration means adapted to configure:
    sending of content to the other device or devices acting as an NFC target or targets if the device is currently outputting the content; and
    receiving of content from the other device or devices acting as an NFC target or targets if the device is not currently outputting content in the case of the device acting as an NFC initiator.

* * * * *